UNITED STATES PATENT OFFICE.

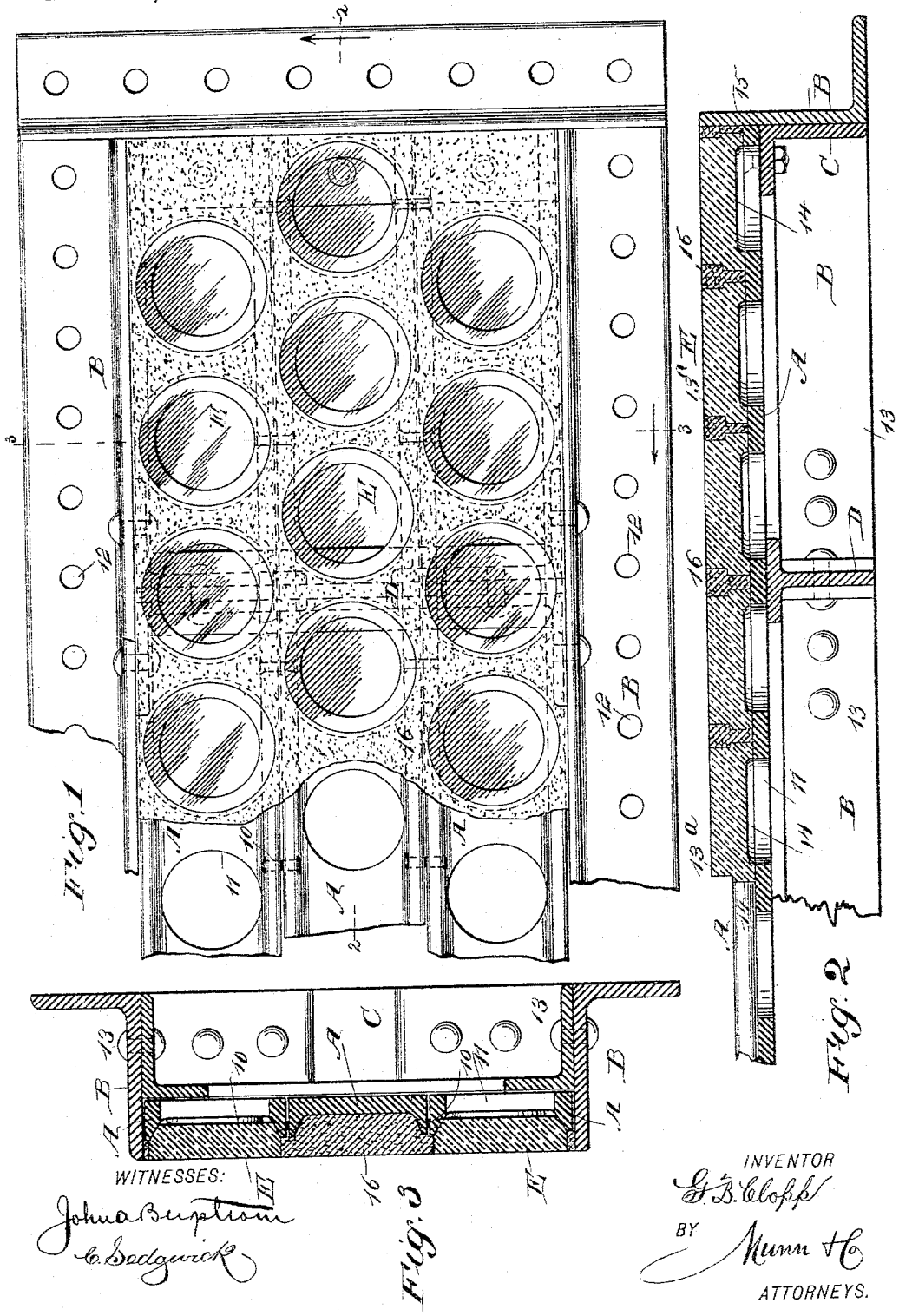

GEORGE B. CLOPP, OF PHILADELPHIA, PENNSYLVANIA.

VAULT-LIGHT.

SPECIFICATION forming part of Letters Patent No. 531,909, dated January 1, 1895.

Application filed March 29, 1894. Serial No. 505,592. (No model.)

*To all whom it may concern:*

Be it known that I, GEORGE B. CLOPP, of Philadelphia, in the county of Philadelphia and State of Pennsylvania, have invented a new and useful Improvement in Vault-Lights, of which the following is a full, clear, and exact description.

My invention relates to an improvement in vault lights, and it has for its object to provide a means whereby a vault light may be cosntructed in an exceedingly simple, durable and economic manner, the framing or body of the vault light being composed of channel and angle irons braced at predetermined points by T, I or angle irons, and to provide a means whereby the lights may be arranged in any desired order, each light being firmly held in position in one of the channel irons, and so located that a space between the lights may be expeditiously and conveniently filled with cement or other appropriate material, the filling and upper faces of the lights being in the same plane.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a partial plan view of the improved vault light. Fig. 2 is a longitudinal section taken essentially on the line 2—2 of Fig. 1; and Fig. 3 is a transverse section taken practically on the line 3—3 of Fig. 1.

In carrying out the invention the frame or body of the vault light is made up of any desired number of channel irons A, the channel faces of the irons being uppermost, and the said irons are placed parallel with their flanges touching, and are tied together to form a rigid structure by means of bolts 10, or the equivalents thereof, passed through abutting flanges of the irons. Each channel iron is provided with any desired number of openings 11. The openings may be of any desired contour, but preferably they are circular as illustrated. The connected channel irons are provided with a frame which surrounds them, the said frame consisting of angle irons B, placed at the sides and at the ends of the connected channel irons, the vertical members of the angle irons being bolted or otherwise secured to the marginal portions of the connected channel irons, and the said vertical members of the angle irons are of such lengths that they will extend downward a predetermined distance below the connected channel irons, as shown in both Figs. 2 and 3. The horizontal members of the angle irons extend outwardly and are usually provided with apertures 12 in order that the framing may be bolted or otherwise secured to a support.

The body portion or entire frame of the vault light is braced and strengthened preferably through the medium of another set of angle irons C, in which the horizontal member is placed uppermost and made to engage with the bottom surfaces of the connected channel irons. These auxiliary angle irons are located one at each end of the framing, extending transversely thereof, and the vertical members of the auxiliary angle irons are bolted or otherwise secured either to the bottom of the channel irons or to the outer angle irons B, or to both, as may be found in practice most desirable.

The strengthening of the frame or body of the vault light is further provided for by locating between the ends of the frame any desired number of T-irons D, the heads of which support the bottom portions of the channel irons, and the said T-irons are connected with the side outer angle irons B through the medium of angle brackets 13 or their equivalents, bolted to said angle irons and to the T-irons, as shown in Figs. 2 and 3.

The lights or lenses E are made to correspond in shape to the shape of the openings 11 in the channel irons, and preferably the openings in the channel irons extend from one side to the other. When said openings are circular, as shown in the drawings, the lenses or lights are circular, and are made in two diameters 13ª and 14, the lower portion being of the greater diameter and of a thickness corresponding practically to the height of the flanges of the channel irons. Therefore it becomes necessary under this construction to cut away or flatten opposite sides of the larger portion 14 of a lens in order that it may fit closely to the flanges of the channel irons; and the diameter of the lower portion of each lens or light is sufficient to enable it to extend well over upon the bottom of the channel irons beyond the margin of the opening 11 it is adapted to cover, as shown in Fig. 2; and the bottom of each lens or light is provided with a recess corresponding in shape and size to the opening 11 over which it is placed as is likewise shown in Fig. 2, forming thereby bottom flanges 15, the inner wall of which will be flush with the margin of the opening When the lights or lenses are in position a filling 16 of cement or other desired material is placed in the space between the lenses and is carried flush with the upper faces thereof, and flush with the upper edges of the outer angle irons B, which angle irons are made to extend up a suitable distance beyond the flanges of the channel irons, and the shoulders produced in the lenses or lights, by reason of their being made in two diameters, will afford a sufficient bearing for the filling in material to enable the latter to hold the lenses firmly in place.

It will be understood that the arrangement of the lights or lenses may be as fancy may dictate.

A vault light constructed as above set forth may be not only expeditiously but exceedingly economically made, since all the material employed is stock material, and it may be connected or built up in a manner enabling the vault light to be applied wherever such an article is necessary.

Having thus described my invention, I claim as new and desire to secure by Letters Patent—

1. In a vault light, a lens support consisting of channel irons placed side by side and connected, the channel irons being provided with apertures between their flanges, and lenses adapted to cover the apertures in the channel iorns, said lenses engaging with the flanges of the channel irons, as and for the purpose set forth.

2. In a vault light, the combination, with a lens support consisting of a series of connected channel irons provided with openings between their flanges, and a framing of angle irons receiving the said lens support and secured thereto, the attached members of the framing extending above and below the lens support, of lenses adapted to cover the openings in the channel irons, the spaces between the lenses being adapted to be filled with a cement material, and braces attached to the framing and engaging with the under surface of the channel irons or lens support, as specified.

GEORGE B. CLOPP.

Witnesses:
H. L. KLEINSMITH,
R. S. REED.